Figure 1:
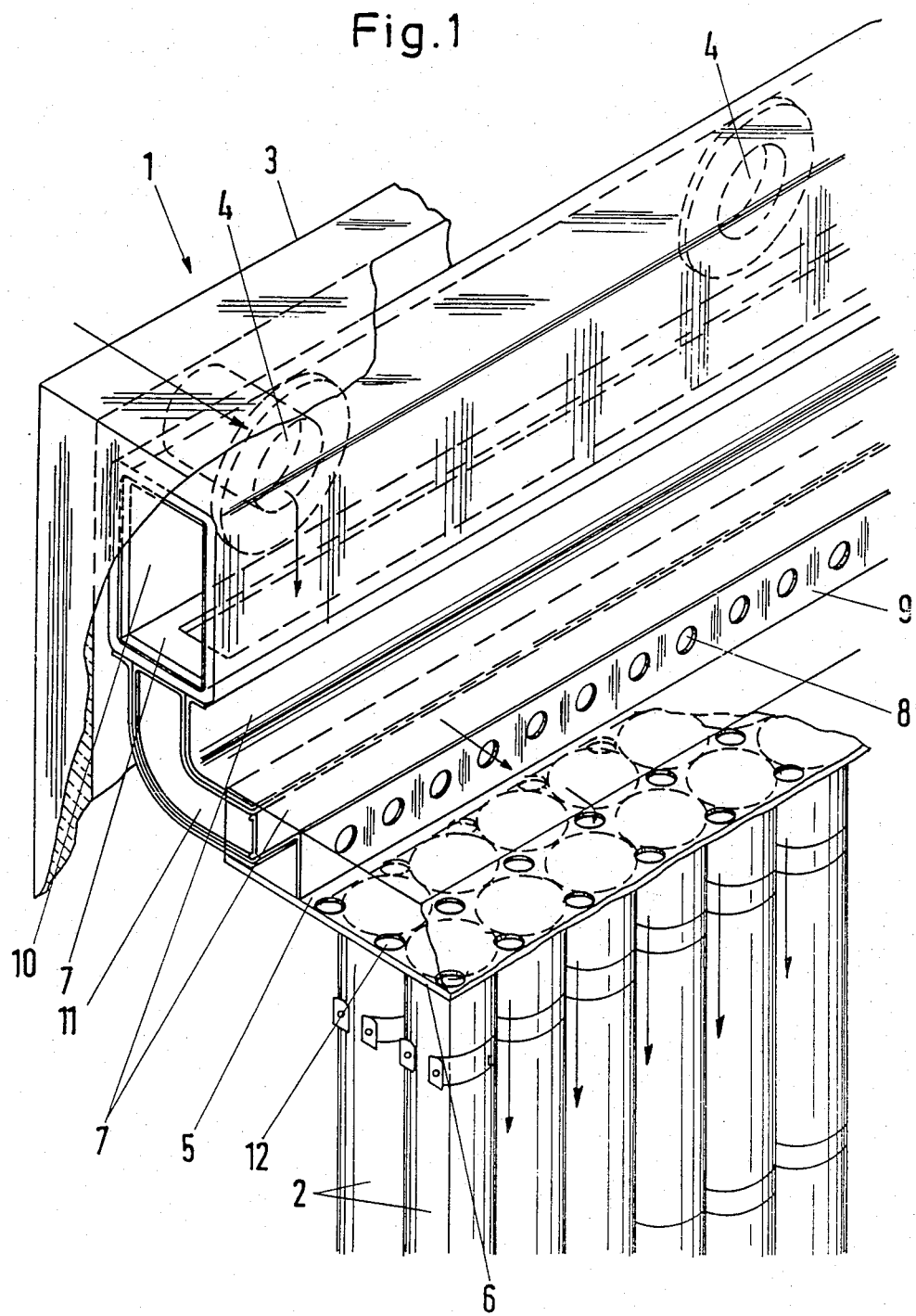

United States Patent [19]

Eck

[11] Patent Number: 4,865,929
[45] Date of Patent: Sep. 12, 1989

[54] HIGH-TEMPERATURE STORAGE BATTERY

[75] Inventor: Gismar Eck, Karlsruhe, Fed. Rep. of Germany

[73] Assignee: Asea Brown Boveri Aktiengesellschaft, Mannheim, Fed. Rep. of Germany

[21] Appl. No.: 261,744

[22] Filed: Oct. 24, 1988

[30] Foreign Application Priority Data

Oct. 23, 1987 [DE] Fed. Rep. of Germany ....... 3735931

[51] Int. Cl.$^4$ .......................................... H01M 10/50
[52] U.S. Cl. ...................................... 429/120; 429/72
[58] Field of Search ..................... 429/120, 26, 72, 34, 429/38, 39, 88, 71

[56] References Cited

U.S. PATENT DOCUMENTS 4,443,524 4/1984 Meinhold et al. ..................... 429/99
4,517,263 5/1985 Reiss ................................... 429/120
4,522,898 6/1985 Esrom ................................. 429/120

Primary Examiner—Anthony Skapars
Attorney, Agent, or Firm—Herbert L. Lerner; Laurence A. Greenberg

[57] ABSTRACT

In order to uniformly distribute a coolant, e.g. air, over gaps between electrochemical cells in high-temperature storage batteries, it has already been proposed to place an open chamber above the groups of cells from which the coolant is preferably conveyed to the cells through holes in a distributor panel. The object of the invention is to even further improve the distribution of the coolant. In order to achieve a uniform, quasi-flat incident flow profile for the coolant over the distributor panel, an antechamber is provided for receiving the coolant from at least one inlet opening and for passing the coolant through several throttle locations into an open chamber and then through holes in the distributor panel to the cells. The invention can be applied to sodium/sulphur batteries, for example.

6 Claims, 2 Drawing Sheets

HIGH-TEMPERATURE STORAGE BATTERY

The invention relates to a high-temperature storage battery having several electrochemical cells disposed in a housing formed of thermal insulation with inlet and outlet openings for a coolant, preferably air, the coolant being conveyed from at least one inlet opening into an open chamber and from there through openings in a distributor panel to gaps between the cells.

Such a battery is known from German Published, Non-Prosecuted Application DE-OS 32 47 969. That battery has several electrochemical cells for storing electrical energy. The battery operates at elevated temperatures, such as in the temperature range from about 300° to 350° C. in the case of a sodium/sulphur battery.

In order to be able to maintain that temperature, high-efficiency thermal insulation is provided. Heat losses during idle phases can consequently be kept low. On the other hand, in the charging or discharging mode heat is generated due to to the battery effect which results in an increase in the cell temperature. When an upper cell temperature is reached, heat has to be removed with the aid of a cooling system.

Details regarding the construction of a high-temperature storage battery and the cooling system are to be found in German Published, Non-Prosecuted Application DE-OS 32 47 969 mentioned above. It is, in particular, known from the latter to cover a configuration of several electrochemical cells with a panel which is provided with holes. The panel acts as a distributor for a coolant, normally air. A blower which is necessary for this purpose may be disposed outside the battery. As may be inferred from FIGS. 1 and 3 to 6 and the accompanying description of the publication mentioned above, the air is first fed through an inlet opening of the battery into an upper free space or open chamber above the perforated panel, from there into gaps between the cells and finally to a outlet opening. A number of measures are specified which are intended to result in a desired distribution of the cooling air. For example, it is proposed therein to provide the holes in the distribution panel with different sizes in order to counteract the formation of hot spots. Finally it may be inferred from the publication that the distributor panel may also be disposed beneath the cells instead of above the cells.

It has been found that although the measures already proposed are expedient, they still require improvement in order to achieve the necessary uniform distribution of the coolant.

It is accordingly an object of the invention to provide a high-temperature storage battery, which overcomes the hereinafore-mentioned disadvantages of the heretofore-known devices of this general type and which further improves the systems for conveying and distributing the coolant in the battery.

With the foregoing and other objects in view there is provided, in accordance with the invention, a high-temperature storage battery, comprising a housing formed of thermal insulation with at least one inlet opening formed therein for coolant, an antechamber downstream of the at least one inlet opening in coolant flow direction, a plurality of throttle locations downstream of the antechamber, an open chamber downstream of the throttle locations, a distributor panel having openings formed therein downstream of the open chamber, and a multiplicity of electrochemical cells mutually spaced apart in the housing defining gaps therebetween downstream of the openings in the distributor panel.

In accordance with another feature of the invention, the antechamber has a wall adjacent the open chamber in the form of a sheet metal orifice plate having perforations formed therein defining the throttle locations.

In accordance with a concomitant feature of the invention, the antechamber includes a plurality of subsystems interconnected in parallel and/or in series.

The invention provides the advantage of a quasi-flat inflow profile in the free space or open chamber transverse to the main flow direction through the distributor panel, with the aid of the proposed antechamber. The flow in the free space or open chamber may be above a distributor panel which is above the cells according to one embodiment, or below a distributor panel which is underneath the cells, according to another embodiment. The profile is achieved regardless of the velocity of the coolant flow at the inlet opening of the battery. Without the antechamber according to the invention, such a flow profile is not established because the inlet opening has to be as small as possible in order to minimizing the heat losses while the distributor panel in the free space or open chamber above or below the cells has a relatively large area.

Other features which are considered as characteristic for the invention are set forth in the appended claims.

Although the invention is illustrated and described herein as embodied in a high-temperature storage battery, it is nevertheless not intended to be limited to the details shown, since various modifications and structural changes may be made therein without departing from the spirit of the invention and within the scope and range of equivalents of the claims.

Figure 2:
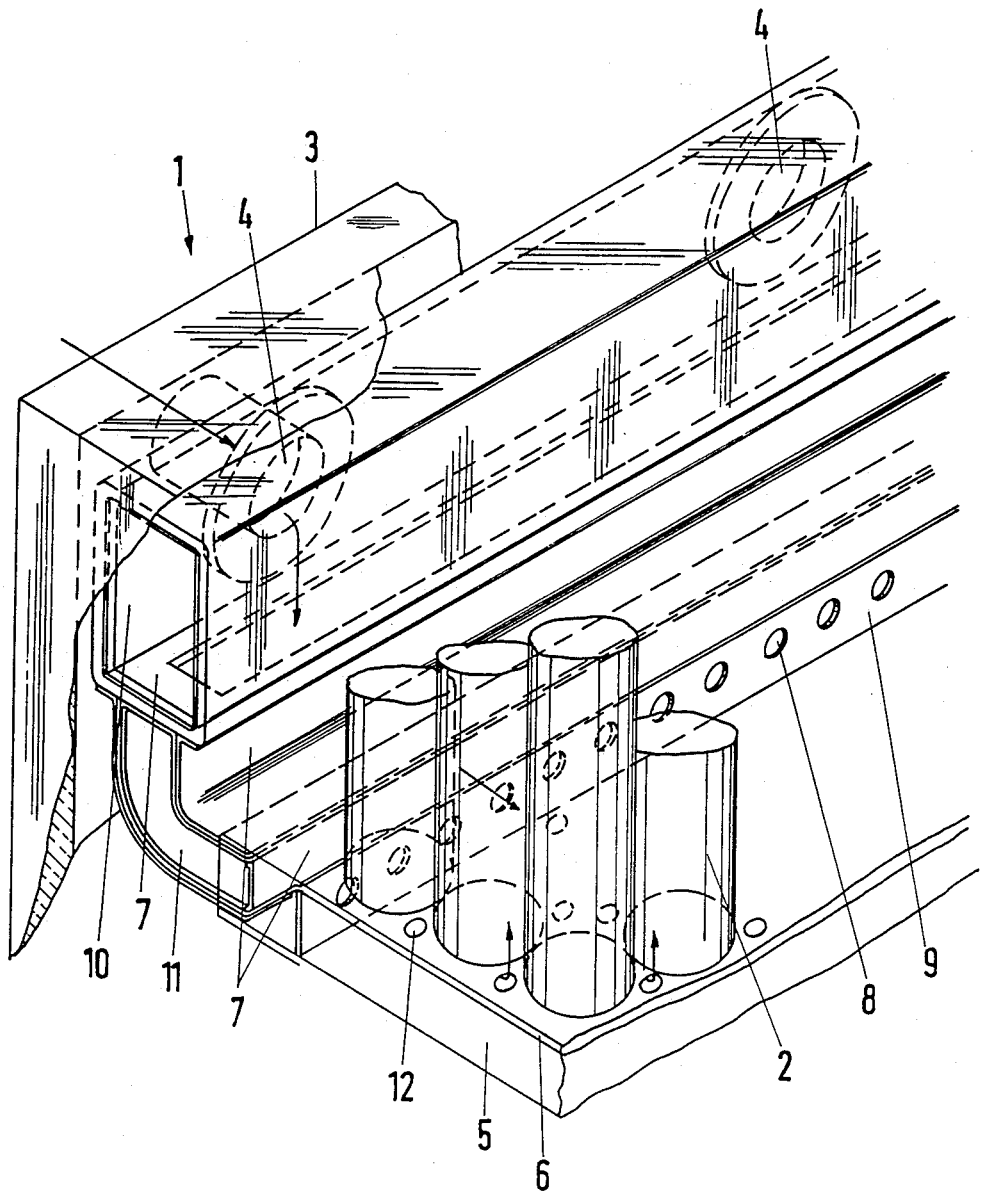

The construction and method of operation of the invention, however, together with additional objects and advantages thereof will be best understood from the following description of specific embodiments when read in connection with the accompanying drawings, in which:

FIG. 1 is a fragmentary, diagrammatic, partly broken-away perspective view of configuration of cells below a distributor panel; and FIG. 2 is a view similar to FIG. 1 showing a configuration of cells above the distributor panel.

Referring now to the figures of the drawing in detail and first, particularly, to FIG. 1 thereof, there is seen a portion of a high-temperature storage battery 1. The battery 1 contains a configuration of several electrochemical cells 2 and is surrounded by thermal insulation 3 providing a housing. The thermal insulation 3 is perforated at several locations with passageways in order to permit battery terminals, measuring conductors and cooling connections to pass through. Such passageways have to be kept as small as possible and the number of passageways must be kept to a minimum. For example, preferably only one inlet opening 4 should therefore be provided for a coolant, for example air, and the cross section of the inlet opening 4 should be small. In order to achieve a flow in a free space or open chamber 5 above a distributor panel 6 which has a substantially uniform flat flow profile and specifically which is parallel to the distributor panel 6 despite the resultant high inflow velocity, an antechamber 7 is provided in which the coolant builds up and flows through several throttle locations 8, for example nozzles or holes in a sheet metal orifice plate 9, into the free space or open chamber 5. The plate 9 may be considered a wall of the antechamber 7. In the embodiment used as an example, the antechamber 7 is formed of a channel 10 which runs transversely to the inlet opening or openings 4 and merges into a curved compartment 11 and which is closed off by the perforated orifice plate 9 having the throttle locations 8. The antechamber (7) may include a plurality of subsystems interconnected in series and/or in parallel. It is essential that the coolant flows into the free space or open chamber 5 with the same volumetric flow at all of the throttle locations 8. The path of the coolant from the inlet opening 4 through the antechamber 7 and the throttle locations 8 into the free space or open chamber 5 and from there through openings or holes 12 in the distributor panel 6 into gaps between the cells 2, is indicated by arrows. In the gaps between the cells, the coolant absorbs the thermal power loss of the adjacent cells and is fed through a non-illustrated collecting channel to a likewise non-illustrated outlet opening.

Depending on the chosen battery structure, the illustrated operating principle can be applied several times through the use of configurations that are connected in series and/or in parallel. In addition, the refinements proposed in German Published, Non-Prosecuted Application DE-OS 32 47 969 can also be applied in connection with the present invention. This means, in particular, that the distributor panel 6 may also be disposed below the cells 2. Such a variation of the structure of the invention is shown in FIG. 2. In the FIG. 2 embodiment the distributor panel 6 covers the top of the free space or open chamber 5 and the coolant flows upwards through the holes 12 in the distributor panel 6 into gaps between the cells 2.

I claim:

1. High-temperature storage battery, comprising a housing formed of thermal insulation with at least one inlet opening formed therein for coolant, an antechamber downstream of said at least one inlet opening in coolant flow direction, a plurality of throttle locations downstream of said antechamber, an open chamber downstream of said throttle locations, a distributor panel having openings formed therein downstream of said open chamber, and a multiplicity of electrochemical cells mutually spaced apart in said housing defining gaps therebetween downstream of said openings in said distributor panel.

2. High-temperature storage battery according to claim 1, wherein said antechamber has a wall adjacent said open chamber in the form of a sheet metal orifice plate having perforations formed therein defining said throttle locations.

3. High-temperature storage battery according to claim 1, wherein said antechamber includes a plurality of interconnected subsystems.

4. High-temperature storage battery according to claim 3, wherein said subsystems are interconnected in parallel.

5. High-temperature storage battery according to claim 3, wherein said subsystems are interconnected in series.

6. High-temperature storage battery according to claim 3, wherein said subsystems are interconnected in parallel and in series.

* * * * *